United States Patent
Saraya et al.

(10) Patent No.: US 9,959,806 B1
(45) Date of Patent: May 1, 2018

(54) OUTPUTTING DATA FOR DISPLAY BEFORE A DEVICE BECOMES INACCESSIBLE

(71) Applicant: International Business Machines Corporation, Armonk, NY (US)

(72) Inventors: Siddharth K. Saraya, Raniganj (IN); Alok K. Singh, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days. days.

(21) Appl. No.: 15/398,614

(22) Filed: Jan. 4, 2017

(51) Int. Cl.
| H04W 52/02 | (2009.01) |
| H04W 4/00 | (2009.01) |
| G06F 1/32 | (2006.01) |
| G09G 3/20 | (2006.01) |
| G06F 13/26 | (2006.01) |

(52) U.S. Cl.
CPC ......... *G09G 3/2096* (2013.01); *G06F 1/3212* (2013.01); *G06F 13/26* (2013.01); *H04W 4/008* (2013.01); *H04W 52/0277* (2013.01); *G09G 2330/027* (2013.01); *G09G 2360/08* (2013.01)

(58) Field of Classification Search
None
See application file for complete search history.

(56) References Cited

U.S. PATENT DOCUMENTS

| 8,793,316 | B2 | 7/2014 | Stanley |
| 9,043,317 | B2 | 5/2015 | Cosgrove et al. |
| 9,319,506 | B2 * | 4/2016 | Funabashi ......... H04M 1/72519 |
| 9,716,965 | B2 * | 7/2017 | Kim ...................... H04W 4/005 |
| 2012/0131496 | A1 * | 5/2012 | Goossens .............. G06F 3/0481 715/784 |
| 2014/0031090 | A1 * | 1/2014 | Hart .................. H04W 52/0277 455/572 |
| 2014/0068494 | A1 * | 3/2014 | Petersen ............. H04M 1/7253 715/778 |
| 2015/0243236 | A1 | 8/2015 | Jain et al. |

OTHER PUBLICATIONS

Nate Hoffelder, "New LCD Screen Tech Can Display Static Images With No Power", Posted on Oct. 29, 2014 [Available Online] http://the-digital-reader.com/2014/10/29/new-lcd-screen-tech-can-display-static-images-power/.

* cited by examiner

*Primary Examiner* — Joni Richer
(74) *Attorney, Agent, or Firm* — Patterson + Sheridan, LLP

(57) ABSTRACT

Systems, methods, and computer program products to perform an operation comprising determining a charge level of a battery of a mobile device, and responsive to determining that the charge level is below a minimum threshold, selecting a first data object from a plurality of data objects stored on the mobile device based on predefined criteria, outputting the first data object on a persistent display device of the mobile device, and powering off the mobile device, wherein the first data object remains visible on the persistent display after the mobile device powers off.

18 Claims, 5 Drawing Sheets

| DATA TYPE (201) | DEVICE ACL (202) | LOCATION (203) | DATE (204) | DATA PRIORITY (205) |
|---|---|---|---|---|
| PERSONAL EMAIL | ALL DEVICES | ALL LOCATIONS | ALWAYS | 2 |
| BUSINESS EMAIL | WORK DEVICES | ALL LOCATIONS | ALWAYS | 1 |
| FLIGHT DETAILS | ALL DEVICES | DEPARTURE CITY | DEPARTURE DATE | 1 |
| HOTEL DETAILS | ALL DEVICES | HOTEL CITY | STAY DATES | 2 |
| BANK INFORMATION | PERSONAL DEVICES | ALL LOCATIONS | ALWAYS | 1 |
| EMAILS FROM PERSONAL CONTACTS | ALL DEVICES | ALL LOCATIONS | ALWAYS | 1 |
| EMAILS FROM UNKNOWN SENDERS | ALL DEVICES | ALL LOCATIONS | 10 MINUTES FROM RECEIPT | 3 |
| . . . . . | | | | |

OUTPUTTING DATA FOR DISPLAY BEFORE A DEVICE BECOMES INACCESSIBLE

BACKGROUND

The present invention relates to computing devices, and more specifically, outputting important data for display before a device becomes inaccessible.

As technology advances, people are more dependent on their mobile devices. Often, people store important data on their mobile devices, or access remotely stored data via their mobile devices. For example, a traveler may store flight, hotel, and car reservations on their smartphone, for use as needed. However, relying on mobile devices to access important data can often leave users without access to the important data when operation of the mobile devices becomes encumbered.

SUMMARY

In one embodiment, a method comprises determining a charge level of a battery of a mobile device, and responsive to determining that the charge level is below a minimum threshold, selecting a first data object from a plurality of data objects stored on the mobile device based on predefined criteria, outputting the first data object on a persistent display device of the mobile device, and powering off the mobile device, wherein the first data object remains visible on the persistent display after the mobile device powers off.

In another embodiment, a system comprises a processor and a memory storing instructions, which when executed by the processor, performs an operation comprising determining a charge level of a battery of a mobile device, and responsive to determining that the charge level is below a minimum threshold, selecting a first data object from a plurality of data objects stored on the mobile device based on predefined criteria, outputting the first data object on a persistent display device of the mobile device, and powering off the mobile device, wherein the first data object remains visible on the persistent display after the mobile device powers off.

In another embodiment, a computer-readable storage medium has computer-readable program code embodied therewith, the computer-readable program code executable by a processor to perform an operation comprising determining a charge level of a battery of a mobile device, and responsive to determining that the charge level is below a minimum threshold, selecting a first data object from a plurality of data objects stored on the mobile device based on predefined criteria, outputting the first data object on a persistent display device of the mobile device, and powering off the mobile device, wherein the first data object remains visible on the persistent display after the mobile device powers off.

BRIEF DESCRIPTION OF THE SEVERAL VIEWS OF THE DRAWINGS

FIG. 2 illustrates an example access control list used to identify important data for display before a device becomes inaccessible, according to one embodiment.

DETAILED DESCRIPTION

Embodiments disclosed herein provide techniques to display data on a display of a mobile device which is without power or is otherwise inaccessible. Generally, the mobile device identifies select data (e.g., the presumptively most important data) for the user based on any number of criteria, such as whether the data is accessible to the user on other nearby devices, whether the data is needed at the current time and/or location, whether display of the data on the mobile device is permitted (e.g., based on an access control list), a priority level of the data, and an importance score computed for the data. Therefore, for example, if a mobile device determines that its battery level is lower than a threshold power level, the mobile device may generate an interrupt. Responsive to the interrupt, the mobile device may identify a one-time passcode sent to the mobile device which is needed by the user to log in to an online account. The mobile device may further determine that the passcode is not accessible on other devices, and is needed by the user within the next 10 minutes. Based on these determinations, the mobile device may output the passcode on a persistent display device included in the mobile device. Doing so continues to display the passcode on the persistent display even after the mobile device loses power (or otherwise becomes inaccessible).

Figure 1A:
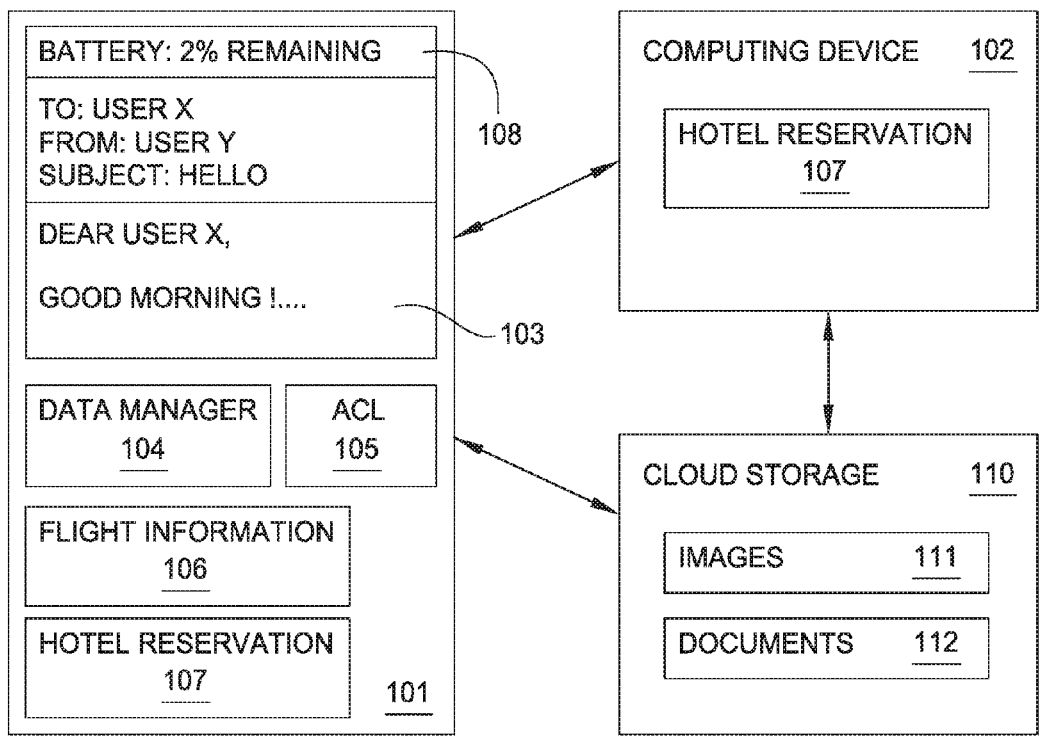
FIGS. 1A-1B illustrate an example system architecture to output important data for display before a device becomes inaccessible, according to various embodiments.

FIG. 1A illustrates an example system architecture 100 to output important data for display before a device becomes inaccessible, according to various embodiments. As shown, the system 100 includes a mobile device 101, a computing device 102, and a cloud storage 110. The mobile device 101 is representative of any type of mobile computing device, including, without limitation, a smartphone, laptop, portable gaming console, tablet computer, and the like. The computing device 102 is representative of any type of computing device, such as a desktop computer, smartphone, laptop, Internet of Things (IoT) device, portable gaming console, tablet computer, and the like. The cloud storage 110 is a data storage solution that allows users to store data and applications that can be accessed from any device having a network connection to the cloud storage 110.

As shown, the mobile device 101 includes a persistent display device 103 which requires power to initially display content (e.g., an image), but thereafter, the power can be turned off, and the displayed content continues to be visible on the display 103. Therefore, the display 103 only requires power when it is refreshed. One non-limiting example of such a display device is an optically rewritable liquid crystal display (ORWLCD). As shown in FIG. 1A, the display 103 of the mobile device 101 is outputting an email for display. However, as shown, a status bar 108 of the display 103 reflects that a battery of the mobile device currently only has 2% of its charge remaining. Therefore, the user of the mobile device 101 may be unable to access content that is stored on the mobile device 101 (or the cloud storage 110) when the battery loses its remaining charge and the mobile device 101 powers down.

Advantageously, however, the mobile device 101 includes a data manager 104, which is configured to output important information on the display 103 in the event the mobile device 101 loses power, or otherwise becomes unavailable (e.g., has a hardware and/or software failure, is turned off, is restarted, and the like). Generally, the data manager 104 identifies important information based on one or more criteria specified the access control list (ACL) 105, the availability of data via other devices in proximity to the user (e.g., the computing device 102 and/or the cloud storage 110), a time relevance of the data, a location relevance of the data, a predetermined priority level for the data, and a score computed for the data.

For example, as shown, the mobile device 101 includes a flight information 106 which includes details for a flight the user is scheduled to take and a hotel reservation 107 which includes details for a hotel the user will stay at while traveling. Additionally, the computing device 102 stores the hotel reservation 107, while the cloud storage 110 stores images 111 and documents 112 for the user of the mobile device 101. Therefore, when the data manager 104 determines that the remaining battery charge level of the mobile device 101 falls below a threshold (e.g., 1%, 5%, 10%, and the like), the data manager 104 generates an interrupt which notifies the mobile device 101 that important data will be outputted for persistent display on the display 103. The data manager 104 may then identify one or more important data objects (e.g., the flight information 106, hotel reservation 107, etc.) to output on the display 103. The mobile device 101 may then be powered off responsive to the interrupt, subsequent to the outputting of the important data objects on the display 103.

For example, the data manager 104 may analyze the flight information 106 to determine that the user's flight is scheduled to depart in 2 hours. The data manager 104 may also determine, using location data provided by a global positioning system (GPS) module (not pictured) of the mobile device 101, that the airport is within 10 miles of the user. The data manager 104 also then communicate with the computing device 102 and cloud storage 110 to determine that the flight information 106 is not stored thereon. The data manager 104 further determines that the parameters stored in the ACL 105 specify that the flight information 106 can be displayed on all devices owned by the user (and is therefore not restricted from display on the display 103 of the mobile device 101). Further still, the data manager 104 may determine that a priority level assigned to the flight information 106 corresponds to a "high" priority level selected from "high," "medium" and "low" priority levels. In at least one embodiment, the data manager 104 determines whether the priority level of the flight information 106 exceeds a minimum priority level threshold (e.g., low priority). In at least one embodiment, the data manager 104 computes an importance score for the flight information 106 based on the foregoing factors.

The data manager 104 may also consider the hotel reservation 107 (along with any other data stored on the mobile device 101). However, the data manager 104 determines, by communicating with the computing device 102, that the hotel reservation 107 is stored on the computing device 102. Furthermore, the data manager 104 may determine that the computing device 102 is accessible to the user of the mobile device 101. Further still, the data manager 104 may determine that a priority level assigned to the hotel reservation 107 corresponds to a "high" priority level. Additionally, the data manager 104 may determine that the hotel reservation 107 specifies that the check-in time for the user's stay begins in 10 hours, and the hotel is located 1,000 miles from the current location of the mobile device 101. As such, if the data manager 104 computes an importance score for the hotel information 107, the computed score would be less than the score computed for the flight information 106. Therefore, the data manager 104 may determine that the hotel reservation 107 is not important enough to persistently output for display on the display 103.

Similarly, the data manager 104 may determine to forego persistently outputting the images 111 and documents 112 stored in the cloud storage 110. For example, a "low" priority level may be assigned to the images stored in the images 111 and documents stored in the documents 112. Additionally, the images 111 and documents 112 are accessible via the computing device 102, which is determined to be in proximity of the user of the mobile device 101.

Figure 1B:
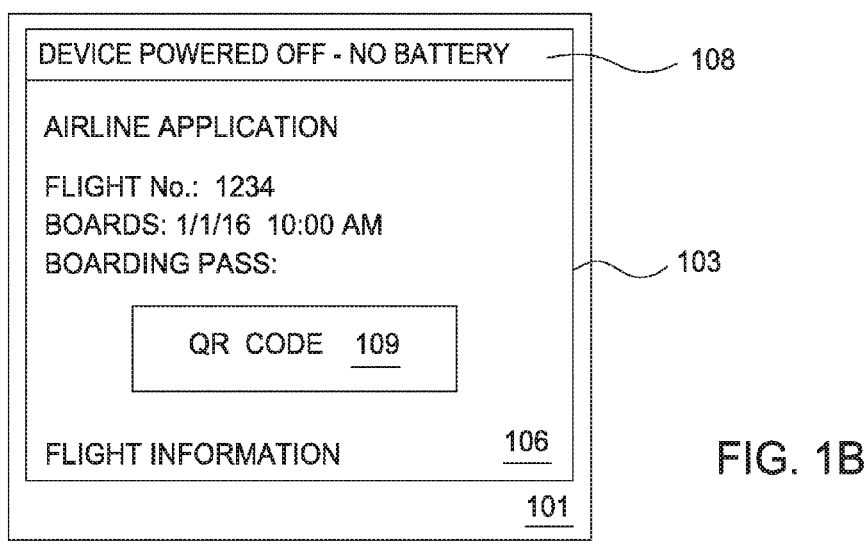

FIG. 1B depicts a state of the mobile device 101 after the mobile device 101 has been powered off (e.g., the battery has lost its charge). As shown, the status information 108 reflects that the device has been powered off because battery has lost its charge. However, the display 103 persistently outputs the flight information 106 for display, which includes a quick response (QR) code 109 corresponding to a boarding pass needed by the user to board their flight. Advantageously, therefore, the user can access the flight information 106 and the QR code 109 to board their flight, even though the flight information 106 and QR code 109 are stored in the mobile device 101, which cannot be turned on.

FIG. 2 illustrates an example ACL 109 used by the data manager 104 to identify important data for display before a device becomes inaccessible, according to one embodiment. As shown, the ACL 109 includes a data type column 201, a device ACL column 102, a location column 203, a date column 204, and a data priority column 205. The data type 201 column specifies a class or type of data objects, such as personal emails, business emails, and the like. Generally, a user may define as many data types for the data type column 201 as they prefer. Thereafter, the data manager 104 may compare metadata or other attributes of an object (e.g., a file extension, default application, etc.) to determine which data type 201 the data object belongs to.

The device ACL column 202 specifies device-specific access permissions for different data types 201. For example, as shown, personal email can be accessed by all devices, while business emails can be accessed only by work devices, and bank account information can only be accessed by personal devices associated with the user. The location column 203 specifies location rules associated with the different data types 201. For example, hotel details are defined as being relevant only in the hotel city, flight details are relevant in the departure city, while personal emails are relevant in all locations. Therefore, if the user is not present in the same city as their hotel, the data manager 104 would likely determine that to forego outputting hotel reservation information for an upcoming hotel stay for persistent display on the display 103.

The date column 204 specifies any date and/or time-related rules for data objects of a given data type 201. For example, as shown, personal emails are always relevant, while flight details are only relevant on the departure date, and emails from unknown senders are relevant only within 10 minutes of receipt of the email. Therefore, if an email from an unknown sender was received more than 10 minutes before the data manager 104 generates the interrupt, the data manager 104 will likely refrain from selecting the email from the unknown sender to persistently output for display on the display 103 once the device is powered off (or otherwise inaccessible). The data priority column 205 corresponds to a priority level assigned to each data type 201. For example, as shown, personal emails are assigned a priority level of "2" on a scale from 1-3, while business emails are assigned a priority level of 1. In at least one embodiment, the priority levels in the data priority column 205 are default priority levels. However, a user may provide custom priority levels in the priority column 205 for any of the data types 201. Furthermore, a user may define any attribute for inclusion in the ACL 109, as well as any additional data types 201. Further still, the user may generally provide custom values for any entry in the ACL 209.

Figure 3:
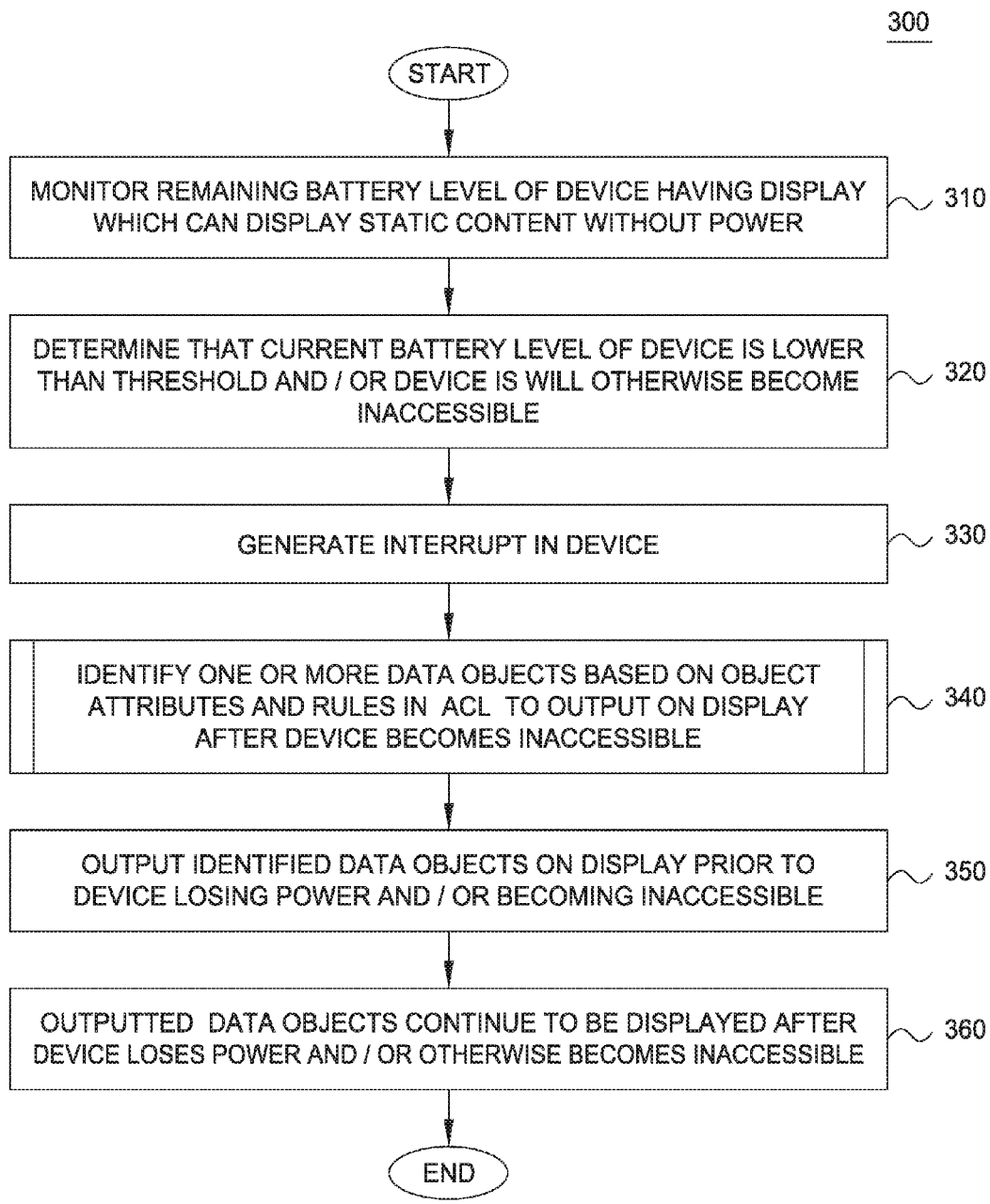
FIG. 3 is a flow chart illustrating an example method to output important data for display before a device becomes inaccessible, according to one embodiment.

FIG. 3 is a flow chart illustrating an example method 300 to output important data for display before a device becomes inaccessible, according to one embodiment. As shown, the method 300 begins at block 310, where the data manager 104 may monitor the battery level of the mobile device 101 having the display 103 which can display static content without power. In at least one embodiment, the data manager 104 determines whether the display 103 can display static content without power prior to performing the method 300. At block 320, the data manager 104 determines that the current battery level of the device is lower than a predefined battery level threshold. In some other embodiments, the data manager 104 determines that the mobile device 101 will become unavailable, such as via a user command to shut down or reboot the mobile device 101, predicting a system failure, detecting a system failure, and the like.

At block 330, the data manager 104 generates an interrupt in the mobile device 101. Doing so may notify other system components to store data while possible, refrain from performing other operations, close applications, and the like. At block 340, described in greater detail with reference to FIG. 4, the data manager 104 identifies one or more data objects to output on the display 103 of the mobile device 101. Generally, the data manager 104 identifies the most relevant and/or important data objects based on the user's subsequent accessibility of the data objects, and attributes of the objects in light of the rules stored in the ACL 109. At block 350, the data manager 104 outputs the identified data objects on the display 103 prior to the mobile device 101 losing power and/or otherwise becoming inaccessible. At block 360, the data objects outputted at block 350 continue to be displayed on the display 103 after the device loses power and/or otherwise becomes inaccessible.

Figure 4:
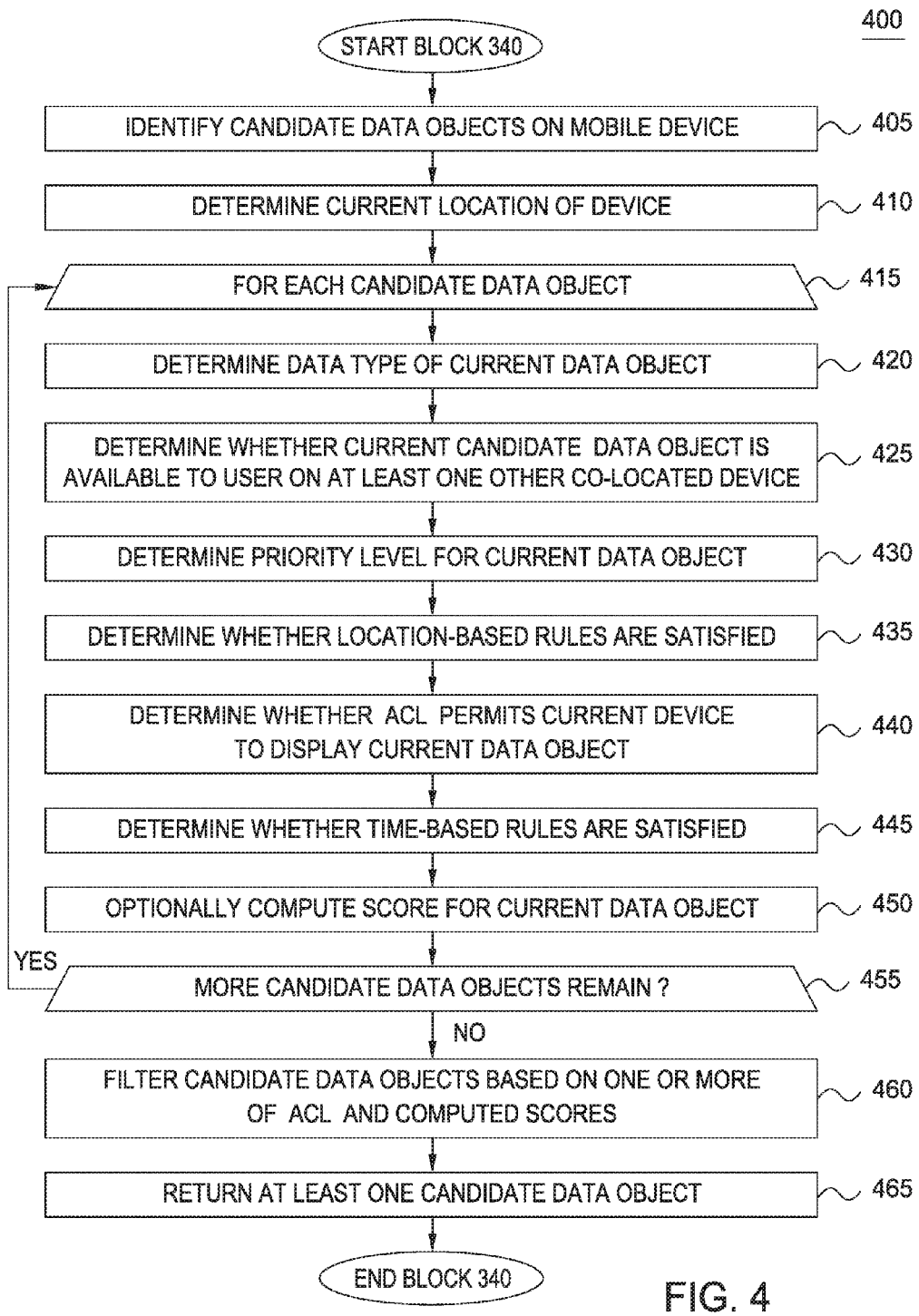
FIG. 4 is a flow chart illustrating an example method to identify data objects to output for display before a device becomes inaccessible, according to one embodiment.

FIG. 4 is a flow chart illustrating an example method 400 corresponding to block 340 to identify data objects to output for display before a device becomes inaccessible, according to one embodiment. As shown, the method 400 begins at block 405, where the data manager 104 identifies candidate objects on the mobile device 101. In at least one embodiment, the data manager 104 identifies all data objects stored on the mobile device 101 as candidate data objects if the count of all objects is lower than a maximum threshold. However, in some embodiments, the data manager 104 identifies candidate data objects based on applications that are currently open and the data objects that are currently being used by the applications. Additionally and/or alternatively, the data manager 104 may consider an access history of each data object, where more recently accessed data objects are selected as candidate data objects rather than less recently accessed data objects. Additionally and/or alternatively, the data manager 104 may consider calendar entries on the mobile device 101, which may correspond to data objects such as hotel reservation details, etc. Additionally and/or alternatively, the data manager 104 may analyze the data objects. For example, the data manager 104 may parse the contents of a text file or email to identify important concepts in the file (e.g., confirmation codes, high importance labels applied to emails, etc.), analyze an image to identify important elements therein, and the like.

At block 410, the data manager 104 determines the current location of the mobile device 101. For example, the data manager 104 may receive location data from a GPS module of the mobile device 101. At block 415, the data manager 104 executes a loop including blocks 420-450 for each candidate data object identified at block 405. At block 420, the data manager 104 determines a type of the current data object. The data manager 104 may determine the type based on one or more of a filename of the data object, an extension of the filename of the data object, metadata associated with the data object, a default application associated with the data object, and the like. For example, the current data object may be an image identified by its file extension.

At block 425, the data manager 104 determines whether the current data object is accessible to the user on at least one other co-located device. For example, if metadata stored by the data manager 104 indicates that a user has two smartphones, the instances of the data manager 104 on each smartphone may attempt to communicate with each other. In at least one embodiment, the data manager 104 uses short-range wireless communications technologies (e.g., Bluetooth®, Wi-Fi®, NFC®, and the like) to communicate. Doing so allows the instances of the data manager 104 to determine whether the devices are within proximity of each other, and whether the current data object is stored or otherwise accessible on each device.

At block 430, the data manager 104 determines the priority level for the current data object by referencing the ACL 109 with the data type of the current data object determined at block 420. Continuing with the image example, images may have a "low" priority level. At block 435, the data manager 104 references the ACL 109 to determine whether any location-based rules are applicable to the current data object, and whether these rules are satisfied. For example, images may have a location-based rule which specifies that the image is relevant if the device is located within 100 meters of where the image was captured. At block 440, the data manager 104 determines whether the ACL 109 permits the outputting the current data object for display on the display 103 of the mobile device 101. Continuing with the image example, the data manager 104 may determine that images can be displayed on all devices owned by the user of the mobile device 101.

At block 445, the data manager 104 determines whether time-based rules specified in the ACL 109 are satisfied. Continuing with the image example, the ACL 109 may specify that images are relevant if they were captured within the previous 5 minutes. At block 450, the data manager 104 optionally computes a score for the current data object. The score may be based on one or more of the determinations made at blocks 420-445. Generally, if the data object does not satisfy one or more rules, the score computed for the data object will be low. Similarly, if the priority of the data object is low, or the data object is accessible on other devices, the score computed for the data object will be low.

At block 455, the data manager 104 determines whether more candidate data objects remain. If more candidate data objects remain, the data manager 104 returns to block 415. Otherwise, the data manager 104 proceeds to block 460. At block 460, the data manager 104 filters the candidate data objects based on one or of the rules specified in the ACL 109 and the scores computed for the data objects. For example, if a data object does not satisfy at least one rule (e.g., a time or location-based rule), the data manager 104 may filter the data object, thereby refraining from selecting the data object for persistent display, as the data object is likely not relevant and/or important to the user. Similarly, if the data object is accessible on other devices, the data manager 104 may filter the data object, as the data object need not be persistently displayed on the display 103 to be accessible to the user.

At block 465, the data manager 104 returns at least one of the candidate data objects. In at least one embodiment, the data manager 104 returns one or more candidate data objects based on the scores computed for each object. For example, the data manager 104 may return the three candidate data objects having the highest computed scores, or all data objects that exceed a minimum score threshold (and would otherwise legibly fit on the display 103). In other embodiments, the data manager 104 may return data objects that have not been filtered for not complying with rules or other requirements. For example, the data manager 104 may return two candidate data objects that comply with all rules in the ACL 109 and are not available on other nearby devices.

Figure 5:
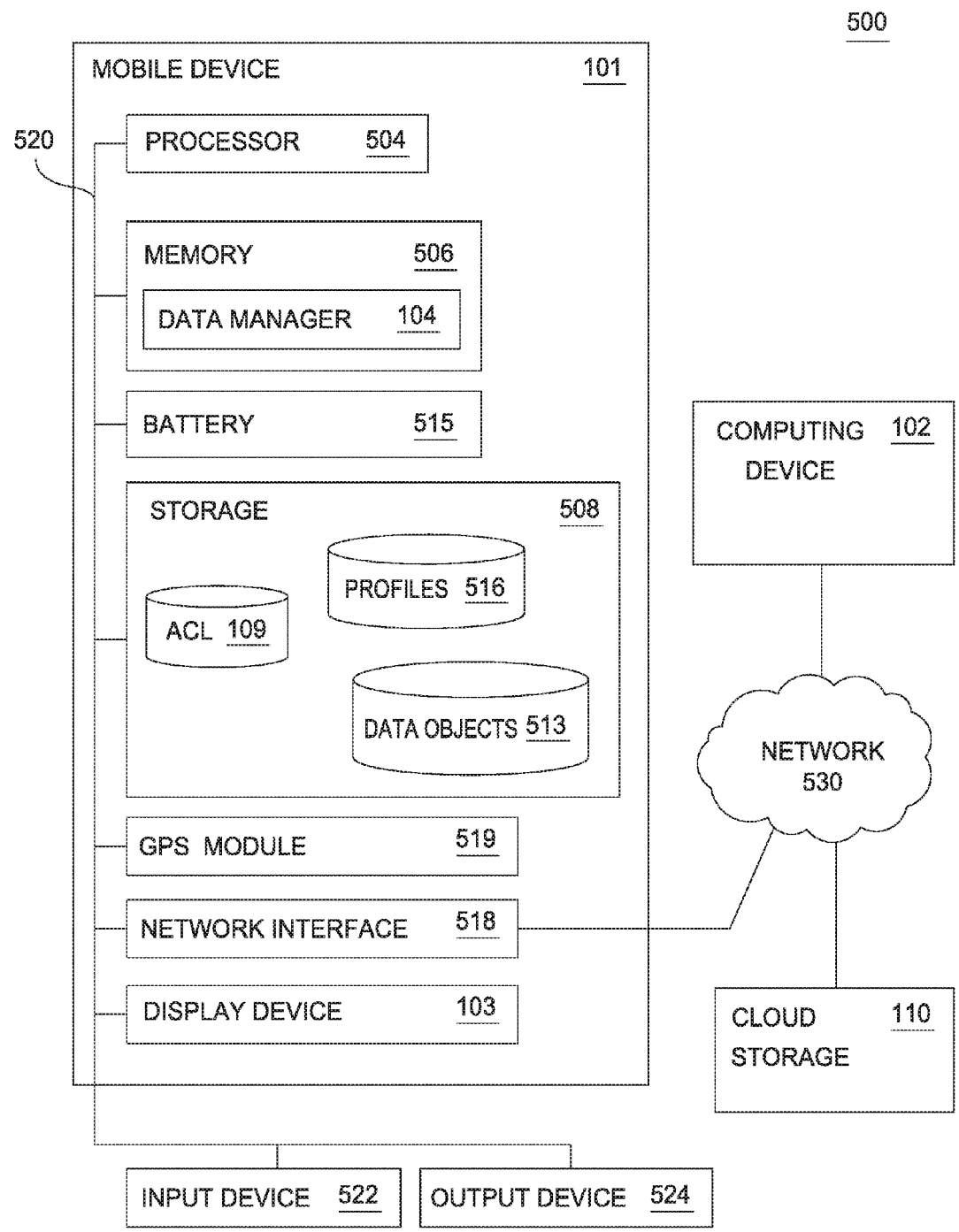
FIG. 5 illustrates an example device which outputs important data for display before a device becomes inaccessible, according to one embodiment.

FIG. 5 illustrates an example device which outputs important data for display before a device becomes inaccessible, according to one embodiment. The networked system 500 includes a mobile device 101. The mobile device 101 may also be connected to other computers (e.g., the computing device 102 and/or the cloud storage 110) via a network 530. In general, the network 530 may be a telecommunications network and/or a wide area network (WAN). In a particular embodiment, the network 530 is the Internet.

The mobile device 101 generally includes a processor 504 which obtains instructions and data via a bus 520 from a memory 506 and/or a storage 508. The mobile device 101 may also include one or more network interface devices 518, a global positioning system (GPS) module 519, the display device 103, input devices 522, and output devices 524 connected to the bus 520. The mobile device 101 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 504 is a programmable logic device that performs instruction, logic, and mathematical processing, and may be representative of one or more CPUs. The network interface device 518 may be any type of network communications device allowing the mobile device 101 to communicate with other computers via the network 530.

The storage 508 is representative of hard-disk drives, solid state drives, flash memory devices, optical media and the like. Generally, the storage 508 stores application programs and data for use by the mobile device 101. In addition, the memory 506 and the storage 508 may be considered to include memory physically located elsewhere; for example, on another computer coupled to the mobile device 101 via the bus 520.

The input device 522 may be any device for providing input to the mobile device 101. For example, a keyboard and/or a mouse may be used. The input device 522 represents a wide variety of input devices, including keyboards, mice, controllers, and so on. Furthermore, the input device 522 may include a set of buttons, switches or other physical device mechanisms for controlling the mobile device 101. The output device 524 may include output devices such as monitors, touch screen displays, and so on.

As shown, the memory 506 contains the data manager 104, while, the storage 508 contains one or more ACLs 109, a set of data objects 513, and user profiles 516. The data objects 513 include any type of digital file and/or application. Generally, the data manager 104 uses the ACLs 109 to determine whether a given data object 513 should be outputted for persistent display on the display 103 when the charge of the battery 515 is below a predefined threshold and/or the mobile device 101 will become inaccessible to users. As previously indicated, the data manager 104 also determines whether the a given data object stored in the data objects 513 is accessible to the user via the instances of the data objects 513 in the computing device 103 and the cloud storage 110 before determining to output the data object on the persistent display 103. The user profiles 516 may specify user accounts, user devices, and other preferences associated with any number of users. Doing so allows the data manager 104 to determine what data and/or devices are associated with a given user in light of the policies specified in the ACLs 109.

Advantageously, embodiments disclosed herein allow users to access important data after their mobile devices lose power or otherwise become unavailable. By providing access control lists, embodiments disclosed herein may determine whether a given device can display the important information, thereby preserving data privacy and security. Furthermore, by considering whether the information is otherwise accessible to users on other devices, embodiments disclosed herein prevent from outputting such data when other more important data can be outputted for persistent display.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to embodiments presented in this disclosure. However, the scope of the present disclosure is not limited to specific described embodiments. Instead, any combination of the recited features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, the data manager 104 could execute on a computing system in the cloud. In such a case, the data manager 104 may store ACLs 109 for a plurality of users at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method, comprising:
   determining a charge level of a battery of a mobile device; and
   responsive to determining that the charge level is below a minimum threshold:
      selecting a first data object from a plurality of data objects stored on the mobile device based on: (i) determining that the first data object is not accessible via a plurality of other devices within a predefined distance of the mobile device, (ii) an access history of each of the plurality of data objects on the mobile device, (iii) a set of applications currently executing on the mobile device;
      outputting the first data object on a persistent display device of the mobile device; and
      powering off the mobile device, wherein the first data object remains visible on the persistent display after the mobile device powers off.

2. The method of claim 1, wherein selecting the first data object comprises:
   identifying a set of candidate data objects from the plurality of data objects stored on the mobile device; and
   identifying the first data object of the set of candidate data objects based on a set of attributes of the first data object and at least one rule specified in an access control list (ACL).

3. The method of claim 2, wherein identifying the first data object comprises one or more of:
   determining that a time-based rule specified in the ACL is satisfied by a time attribute of the set of attributes of the first data object;
   determining that a location-based rule specified in the ACL is satisfied by a location of the mobile device;
   determining that a priority level attribute of the set of attributes of the first data object exceeds a threshold priority level; and
   determining whether the ACL permits display of the first data object on the mobile device.

4. The method of claim 3, wherein identifying the first data object further comprises:
   computing a score for the first data object based on: (i) whether the time attribute of the first data object satisfies the time-based rule specified in the ACL, (ii) whether the location of the mobile device satisfies the location-based rule specified in the ACL, (iii) whether the priority level attribute of the first data object exceeds the threshold priority level, (iv) whether the ACL permits display of the first data object on the mobile device, and (v) whether the first data object is accessible via at least one of the plurality of other devices; and
   determining that the score computed for the first data object exceeds a minimum score threshold.

5. The method of claim 1, wherein the first data object is further selected based on: (i) an analysis of a content of each of the plurality of data objects, and (ii) at least one calendar entry having at least one associated data object in the plurality of data objects.

6. The method of claim 1, wherein the plurality of data objects stored on the mobile device further comprises a second data object, the method further comprising:
   upon determining that the second data object is accessible via at least one device within the predefined distance of the mobile device, refraining from outputting the second data object on the persistent display.

7. The method of claim 1, further comprising:
   subsequent to determining that the charge level of the battery is below the minimum threshold, generating an interrupt in the mobile device, wherein the first data object is selected responsive to the interrupt, wherein the first data object is outputted on the persistent display responsive to the interrupt, and wherein the mobile device is powered off responsive to the interrupt.

8. A computer program product, comprising:
   a computer-readable storage medium having computer readable program code embodied therewith, the computer readable program code executable by a processor to perform an operation comprising:
      determining a charge level of a battery of a mobile device; and
         responsive to determining that the charge level is below a minimum threshold:
         selecting a first data object from a plurality of data objects stored on the mobile device based on: (i) determining that the first data object is not accessible via a plurality of other devices within a predefined distance of the mobile device, (ii) an access history of each of the plurality of data objects on the mobile device, (iii) a set of applications currently executing on the mobile device;
      outputting the first data object on a persistent display device of the mobile device; and
         powering off the mobile device, wherein the first data object remains visible on the persistent display after the mobile device powers off.

9. The computer program product of claim 8, wherein identifying the first data object comprises:

determining that a time-based rule specified in an access control list (ACL) is satisfied by a time attribute of the set of attributes of the first data object;
determining that a location-based rule specified in the ACL is satisfied by a location of the mobile device;
determining that a priority level attribute of the set of attributes of the first data object exceeds a threshold priority level; and
determining whether the ACL permits display of the first data object on the mobile device.

10. The computer program product of claim 9, wherein identifying the first data object further comprises:
computing a score for the first data object based on: (i) whether the time attribute of the first data object satisfies the time-based rule specified in the ACL, (ii) whether the location of the mobile device satisfies the location-based rule specified in the ACL, (iii) whether the priority level attribute of the first data object exceeds the threshold priority level, (iv) whether the ACL permits display of the first data object on the mobile device, and (v) whether the first data object is accessible via at least one of the plurality of other devices; and
determining that the score computed for the first data object exceeds a minimum score threshold.

11. The computer program product of claim 8, wherein identifying the first data object is further selected based on: (i) an analysis of a content of each of the plurality of data objects, and (ii) at least one calendar entry having at least one associated data object in the plurality of data objects.

12. The computer program product of claim 8, wherein the plurality of data objects stored on the mobile device further comprises a second data object, the operation further comprising:
upon determining that the second data object is accessible via at least one device within a predefined distance of the mobile device, refraining from outputting the second data object on the persistent display.

13. The computer program product of claim 8, the operation further comprising:
subsequent to determining that the charge level of the battery is below a minimum threshold, generating an interrupt in the mobile device, wherein the first data object is identified responsive to the interrupt.

14. A system, comprising:
a processor; and
a memory storing one or more instructions which, when executed by the processor, performs an operation comprising:
determining a charge level of a battery of a mobile device; and
responsive to determining that the charge level is below a minimum threshold:
selecting a first data object from a plurality of data objects stored on the mobile device based on: (i) determining that the first data object is not accessible via a plurality of other devices within a predefined distance of the mobile device, (ii) an access history of each of the plurality of data objects on the mobile device, (iii) a set of applications currently executing on the mobile device;
outputting the first data object on a persistent display device of the mobile device; and
powering off the mobile device, wherein the first data object remains visible on the persistent display after the mobile device powers off.

15. The system of claim 14, wherein identifying the first data object comprises:
determining that a time-based rule specified in an access control list (ACL) is satisfied by a time attribute of the set of attributes of the first data object;
determining that a location-based rule specified in the ACL is satisfied by a location of the mobile device;
determining that a priority level attribute of the set of attributes of the first data object exceeds a threshold priority level; and
determining whether the ACL permits display of the first data object on the mobile device.

16. The system of claim 15, wherein identifying the first data object further comprises:
computing a score for the first data object based on: (i) whether the time attribute of the first data object satisfies the time-based rule specified in the ACL, (ii) whether the location of the mobile device satisfies the location-based rule specified in the ACL, (iii) whether the priority level attribute of the first data object exceeds the threshold priority level, (iv) whether the ACL permits display of the first data object on the mobile device, and (v) whether the first data object is accessible via at least one of the plurality of other devices; and
determining that the score computed for the first data object exceeds a minimum score threshold.

17. The system of claim 14, wherein identifying the first data object is further selected based on: (i) an analysis of a content of each of the plurality of data objects, and (ii) at least one calendar entry having at least one associated data object in the plurality of data objects.

18. The system of claim 14, wherein the plurality of data objects stored on the mobile device further comprises a second data object, the operation further comprising:
subsequent to determining that the charge level of the battery is below a minimum threshold, generating an interrupt in the mobile device, wherein the first data object is identified responsive to the interrupt; and
upon determining that the second data object is accessible via at least one device within a predefined distance of the mobile device, refraining from outputting the second data object on the persistent display.

* * * * *